United States Patent [19]
Raney

[11] Patent Number: 6,001,042
[45] Date of Patent: Dec. 14, 1999

[54] CONTINUOUSLY VARIABLE TRANSMISSION WITH RATIO SYNCHRONIZING SYSTEM

[76] Inventor: Richard C. Raney, 2800 Fannin Ave., Midland, Tex. 79705

[21] Appl. No.: 09/018,606

[22] Filed: Feb. 5, 1998

[51] Int. Cl.[6] .................................................. F16H 15/20
[52] U.S. Cl. ............................................ 475/217; 476/55
[58] Field of Search .................................. 475/214, 215, 475/217; 476/55, 61

[56] References Cited

U.S. PATENT DOCUMENTS

| | | | |
|---|---|---|---|
| 1,178,834 | 4/1916 | Beland | 475/217 |
| 1,194,107 | 8/1916 | Whiteside | 475/217 |
| 1,762,199 | 6/1930 | Standish | 475/217 |
| 1,859,815 | 5/1932 | Cutler | 475/214 |
| 1,859,899 | 5/1932 | Thellmod et al. | 475/214 |
| 2,526,435 | 10/1950 | Teigman | 476/55 |
| 2,642,749 | 6/1953 | Wood | 476/55 |
| 4,183,253 | 1/1980 | Borello . | |
| 4,192,200 | 3/1980 | McCoin . | |
| 4,192,201 | 3/1980 | McCoin . | |
| 4,270,415 | 6/1981 | Dickinson et al. . | |
| 4,296,647 | 10/1981 | Kemper . | |
| 4,322,798 | 3/1982 | McCoin . | |
| 4,495,829 | 1/1985 | Kemper . | |
| 4,653,349 | 3/1987 | Kaneyuki . | |
| 4,682,517 | 7/1987 | Francis et al. . | |
| 5,443,429 | 8/1995 | Baxter, Jr. . | |

*Primary Examiner*—Dirk Wright
*Attorney, Agent, or Firm*—Oldham & Oldham Co., L.P.A.

[57] ABSTRACT

The present invention is directed to a continuously variable transmission for varying the speed ratio of an output shaft relative to an input shaft driven by a vehicle engine or other input power source. In an embodiment of the invention, the power transmission system includes a driven input member coupled in driving engagement with at least one rotor to transfer torque to the rotor. A disk member is positioned in cooperative relationship with a rotatable shaft and in a driving engagement with the rotor, such that the disk member is driven to transfer torque to the rotatable shaft. An output member is driven by the rotatable shaft, and torque is transferred from the shaft to the output member, with the disk member being selectively axially moveable relative to the rotor and to the rotatable shaft in response to output load torque on the output member so as to vary the torque transferred from the rotor. There may also be provided a gear system driven by the at least one rotor which may include a planetary gear set and clutch system in parallel cooperation with the output torque of the disk member and cooperating rotatable shaft to extend the speed range of the output member and to provide other beneficial aspects.

28 Claims, 4 Drawing Sheets

CONTINUOUSLY VARIABLE TRANSMISSION WITH RATIO SYNCHRONIZING SYSTEM

BACKGROUND OF THE INVENTION

The invention relates to a power transmission system and more particularly a continuously variable transmission including a low-inertia disk or wheel which is tractionally driven by drive rotors. The invention may further use a multi-range gear system to extend the output speed range of the drive system, which is engaged in differential parallel arrangement with the disk and synchronized therewith for controlling acceleration and deceleration of output from the transmission.

Continuously variable drive systems of various types have been developed in an effort to provide a commercially acceptable transmission which allows a wide range of speeds to be achieved over a continuous range. It is commonly recognized that continuous variation of speed ratios can provide significant improvement in efficiency of a motor vehicle engine, and therefore result in improved fuel economy. Continuously variable transmissions are also used in a variety of other applications to provide a continuous variation of speed over a given range.

In motor vehicles having a continuously variable transmission system, the power transmitted by the vehicle engine to the wheels will pass through a variable ratio transmission, which in turn must be able to withstand the high torque and other conditions encountered. Several types of continuously variable drives have been developed, including traction drives and V-belt continuously variable drives which rely on belts and moveable pulleys. Prior systems have encountered significant problems including rapid fatigue and failure of main components, insufficient power density, a limited speed range, unstable ratio control, excessive cost or other problems which have not been adequately solved for commercial use of such systems to a wide extent. There is therefore a pressing need for a continuously variable transmission which overcomes these problems and can be produced cost effectively.

SUMMARY OF THE INVENTION

The present invention is therefore directed to a continuously variable transmission for varying the speed ratio of an output shaft relative to an input shaft driven by a vehicle engine or other input power source. In an embodiment of the invention, the power transmission system includes a driven input member coupled in driving engagement with at least one rotor to transfer torque to the rotor. A disk member is positioned in cooperative relationship with a rotatable shaft and in a driving engagement with the rotor, such that the disk member is driven to transfer torque to the rotatable shaft. An output member is driven by the rotatable shaft, and torque is transferred from the shaft to the output member, with the disk member being selectively axially moveable relative to the rotor and to the rotatable shaft in response to output load torque on the output member so as to vary the torque transferred from the rotor. There may also be provided a gear system driven by the at least one rotor which may include a planetary gear set and clutch system in parallel cooperation with the output torque of the disk member and cooperating rotatable shaft to extend the speed range of the output member and to provide other beneficial aspects.

It is therefore an object of the invention to provide a power transmission system, and particularly a continuously variable power transmission, which provides adequate power density, a wide range of output speeds, and efficient speed ratio control in a rugged and cost effective construction.

DETAILED DESCRIPTION OF THE INVENTION

Figure 1:
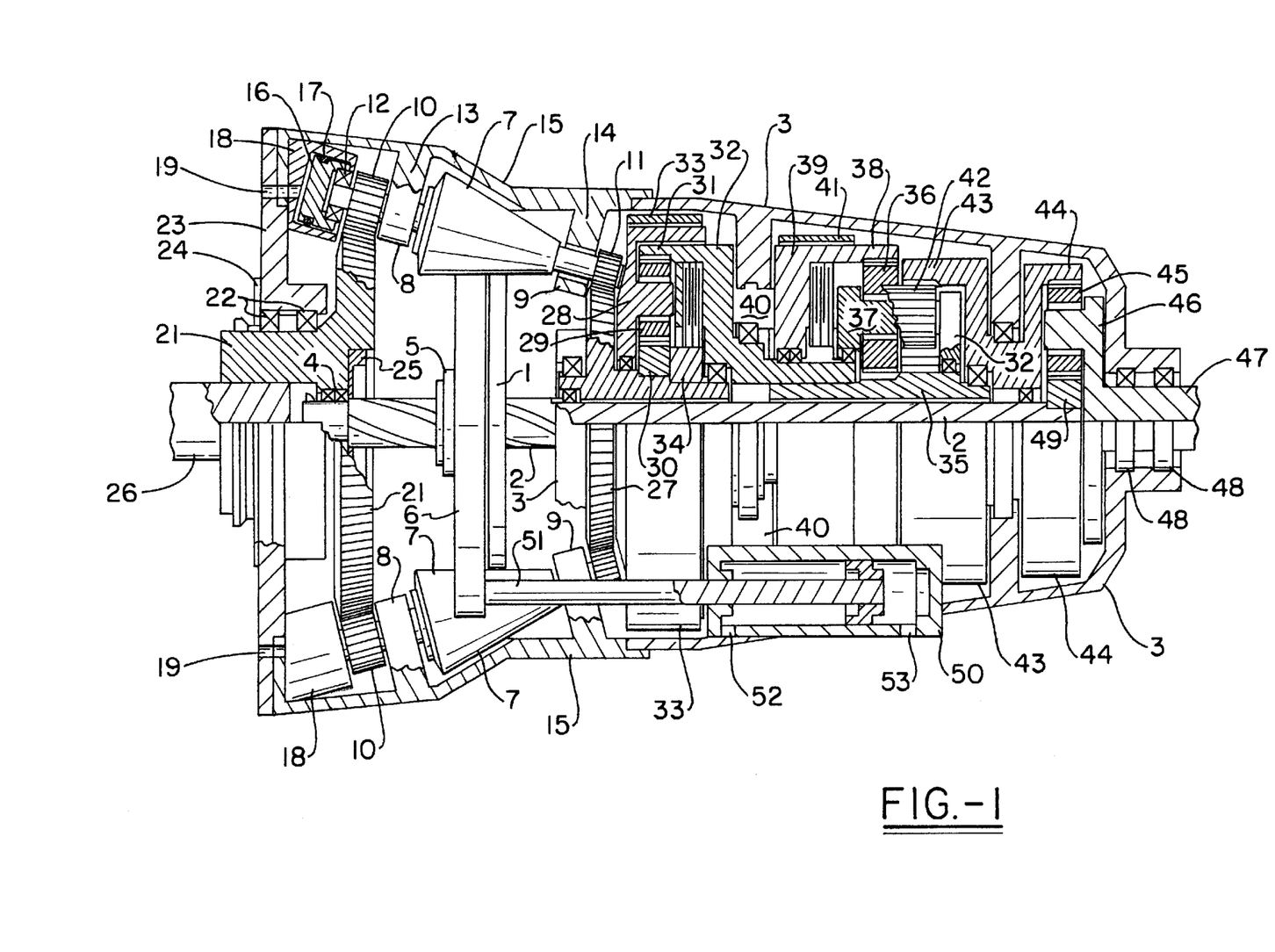
FIG. 1 is a partially sectioned longitudinal side view of an apparatus formed in accordance with the present invention.

In FIG. 1, a preferred embodiment of the invention is shown in the environment of a vehicle drivetrain to convert drive torque from the engine to drive wheels of the vehicle. The transmission may comprise a central tractionally driven member or disk 1 mounted upon and with a support coaxial shaft 2. Note that all elements of the apparatus are located within a housing 3. Note also that shaft 2 is supported on appropriate bearings, such as bearing set 4 at the front end of shaft 2, which may be a thrust type bearing arranged to prevent axial movement of shaft 2. Disk 1 is rigidly mounted upon a concentric hub 5 which may be in the form of a recirculating ball bearing spline conforming to and engaged with a helical ball spline portion of shaft 2. Hub 5 is so arranged to allow disk 1 to travel axially along shaft 2 by screw action therebetween, in a low friction manner, while simultaneously transmitting torque cooperatively. The ball spline structure of hub 5 and shaft 2 are generally known and therefore not shown in detail.

A positioning arm 6 is connected to hub 5 by means of an appropriate bearing such as a thrust bearing within arm 6. Arm 6 is arranged to move axially along shaft 2 to thereby control the axial position of disk 1 while allowing free rotation of disk 1 and shaft 2 relative thereto.

A plurality of conical rotors 7 are symmetrically positioned circumferentially about disk 1 so that the inwardly facing sides of the cones 7 are parallel to shaft 2 and in frictional engagement with the rim of disk 1. In the preferred embodiment, eight cones 7 may be provided about the periphery of disk 1, though only two cones 7 are shown. For tractionally driven elements such as disk 1, the fatigue life of the driven element as well as the bearings on which they may be supported, can be calculated using the following commonly known formula:

$$\text{Life(hours)} = \frac{K}{RPM} \times \left(\frac{\text{Rated Load}}{\text{Applied Load}}\right)^3$$

Figure 4:
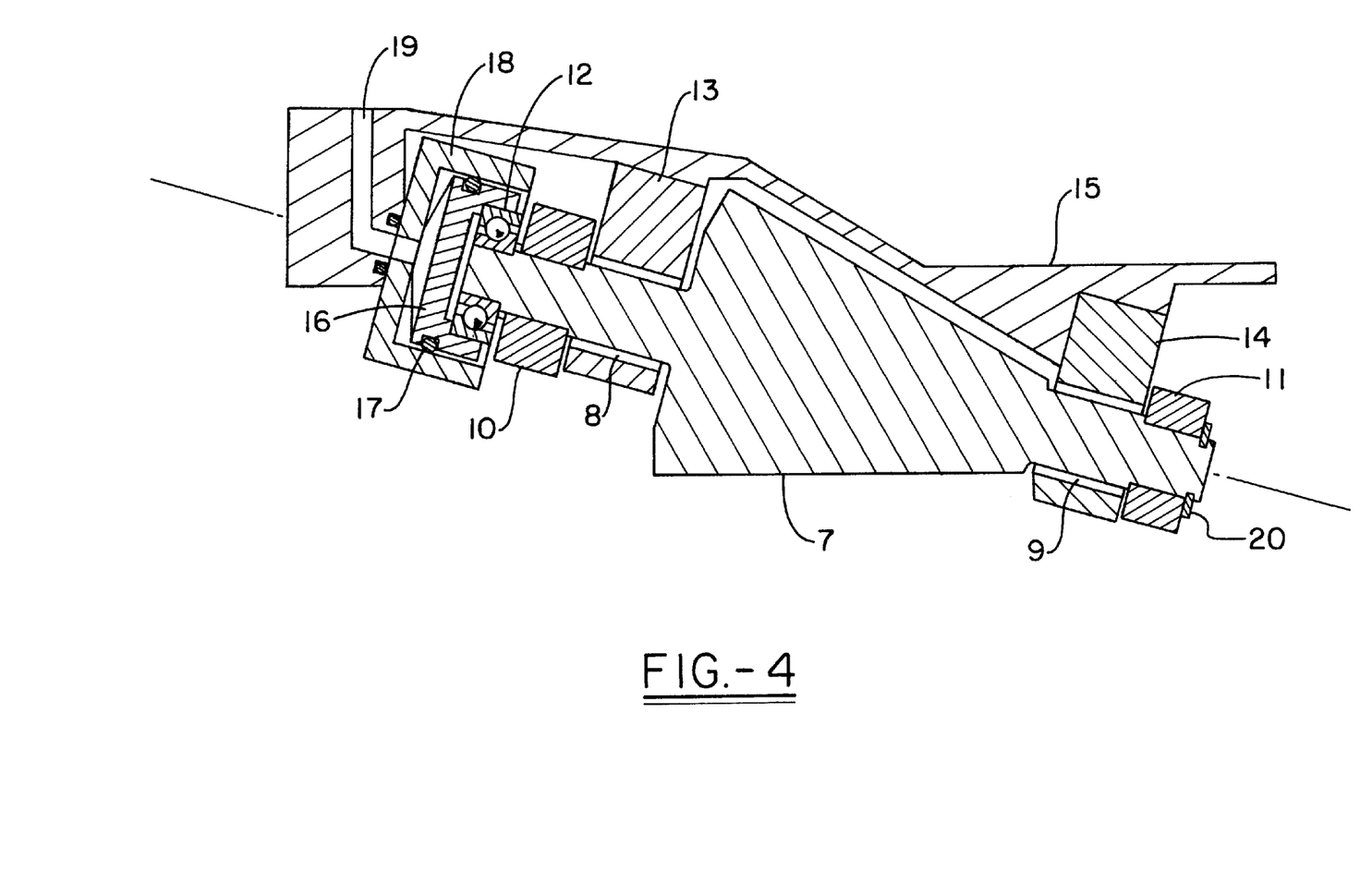
FIG. 4 is a detached sectional illustration of a cone assembly included in the apparatus of FIG. 1.

From this, it should be noted that the applied load must be held to relatively light limits to prevent rapid fatigue failure. Further, applied load has a much greater impact on fatigue life than does rotational speed of the elements. The torque output from the disk 1 is also proportional to the applied traction contact load and number of tractional contact points. Again, the optimum number of tractional drive members or cone 7 may be therefore be chosen for the particular environment and application of the power transfer system. In the present invention, the preferred embodiment utilizes the maximum number of contact points to provide maximum power output, with final output speed predetermined by a differential gear assembly which will be described hereafter. The disk member 1 as well as the tractional drive member 7 are designed and arranged to sustain extremely high rotating speeds without causing rapid failure. Note also that the cones 7 of this embodiment are fifteen degree (15°) cones each having approximately three to one (3:1) diametrical ratio, although other embodiments might include cones of a different angle, size and ratio configuration. FIG. 4 shows the cone assembly in more detail. Each cone 7 includes a concentric shaft extending from each end supported by bearings 8 and 9. A drive gear 10 is provided at its front end and an output gear 11 at its rear end, with a thrust bearing 12 supporting the shaft at its front end, as shown. Bearings 8 and 9 are, preferably, needle-type roller bearings capable of sustaining extremely high rotating speeds and relatively high radial loads. Bearings 8 and 9 are mounted in bearing blocks 13 and 14, respectively, which are in turn fastened to a cone assembly cap 15 attachable to the main housing 3. A concentric piston 16 is arranged to abut thrust bearing 12 rearwardly and to be sealed by means of an o-ring 17 within a forcing cylinder 18. The cylinder 18 in turn abuts the end of cap 15 forwardly so that piston 16 applies axial thrust through bearing 12 to cone 7 whenever fluid pressure is directed through a port 19 into cylinder 18 and against piston 16. Cylinder 18 and piston 16 are arranged in fixed position about rotating cone assembly 7 with thrust applied through bearing 12. Note also that bearings 8 and 9, and the mating shaft journals of cone 7, are arranged to allow slight but adequate axial movement of cone 7. Drive gear 10 may be keyed on its shaft and is retained on its shaft by axial force through bearing 12. Output gear 11 may also be keyed and is retained on its shaft by means of a snap-ring 20, shown in FIG. 4. Both gears 10 and 11 are keyed to their shafts in the usual manner.

As shown in FIG. 1, an input ring gear 21 is provided in common mesh with drive gears 10 and is supported in bearing set 22 in association with a front mounting plate 23. Bearing set 22 is preferably of the type capable of supporting both radial and axial loads and is retained within plate 23 by a retaining plate 24. Bearing set 4 prevents axial movement of shaft 2, and is anchored concentrically within gear 21 by retainer 25. Gear 21 is arranged to be coupled to and driven by a suitable drive, such as an engine flywheel or, as shown in this embodiment, to be coupled to a common input shaft 26 driven by any suitable power source such as an electric motor, a gas or steam turbine, an automotive engine or the like. Note that in the embodiment to be described, gear 21 may be driven by a truck or automobile engine.

An output ring gear 27 is provided in common mesh with output gears 11 and is arranged to drive a planetary gear system, which preferably is a multi-range gear and clutch system in parallel cooperation with the output torque of wheel 1 and shaft 2. As shown in FIG. 1, the hub or neck portion of gear 27 is supported in suitable bearings.

The multi-range gear system may include a planet gear carrier 28 mounted concentrically and rotatably on the neck portion of gear 27 by means of a bearing as shown in FIG. 1. Carrier 28 supports a plurality of planet gears 29, of which there will normally be at least four, and which are sized and arranged to commonly mesh with a corresponding sun gear 30. The sun gear 30 is concentrically keyed to the neck portion of gear 27 and is arranged to commonly mesh with and drive planet gears 29. An internally toothed ring gear 31, which may be an integral part of a clutch body 32, is sized and arranged to commonly mesh with the outside of planet gears 29, opposite to sun gear 30. The outer rim of carrier 28 is formed as a clutch drum shaped and sized to accommodate frictional engagement by a clutch band 33. The outer rim and clutch drum portion of carrier 28 is also shaped and sized to allow engagement between ring gear 31 and planet gears 29 and to allow free rotation thereof A conventional mechanism for clamping band 33 against carrier 28 may be employed.

Clutch body 32 may contain a conventional multi-disk clutch assembly arranged to engage and disengage clutch body 32 with a driving collar 34 keyed to the neck of gear 27 along side sun gear 30. Clutch body 32 has a neck portion extending axially rearward to accommodate bearing support and to facilitate coupling with other elements. A secondary sun gear 35 may be keyed internally to clutch body 32 and extends further rearward to accommodate additional bearing support. Sun gear 35 has a set of gear teeth formed thereon which are arranged to commonly mesh with and drive a secondary set of planet gears 36, supported in a secondary planet gear carrier 37. Carrier 37 is supported on appropriate bearings mounted on clutch body 32 and on sun gear 35. A secondary internally-toothed ring gear 38, which is integral to a secondary clutch body 39, meshes with planet gears 36 opposite sun gear 35. A secondary clutch body 39 is rotatably mounted on clutch body 32 by means of a suitable bearing set.

In the same manner as clutch body 32, secondary clutch body 39 includes a multi-disk clutch assembly arranged to engage and disengage a drive collar keyed or integral to clutch body 32. A clutch pressure inductor 40 is provided, in a conventional manner, to direct selectively fluid pressure to clutches 32 and 39 respectively. A secondary clutch band 41 is also provided and arranged for frictional engagement with a corresponding surface provided on the outside rim of clutch body 39.

A double-length set of planet gears 42 may be rotatably mounted with carrier 37 so that one end thereof meshes with planet gears 36, without contacting sun gear 35 or ring gear 38. For example, three gears 36 and three gears 42 may be symmetrically arranged in the desired configuration. Note also that, being meshed with gears 36, the spin of double length gears 42 will be opposite to the spin of gears 36. The rearward end of double length gears 42 are meshed with an internally-toothed ring gear 43 which is integrally connected to an output ring gear 44, both of which are supported in appropriate bearings.

Output ring gear 44 is internally toothed and arranged to commonly mesh with a set of output planet gears 45. The output planet gears, of which there would normally be at least four, are symmetrically arranged and mounted on axially disposed spindles formed integrally to an output hub 46 which in turn is integral to an output shaft 47 supported in an appropriate bearing set 48. The output planet gears 45 as with other planet gear sets in the preferred embodiment are equipped with needle-type roller bearings for low friction spin. The planet gears 45 commonly mesh with an output sun gear 49, which is keyed on the rearward end of shaft 2. Note that gear 27, carrier 32 and gear 35 are configured to allow axial placement of shaft 2 as needed.

To control positioning arm 6, a pair of axially disposed control cylinders 50 are mounted to housing 3 on opposite sides of the above described multi-range gear system. Note that only the near-side cylinder 50 is shown in FIG. 1, for simplicity. Each cylinder 50 includes a cylinder rod 51, of a suitable length and stiffness, which is rigidly attached to its respective outer end of arm 6 so as to effectively control the axial position of arm 6 by action of the cylinders 50 and cylinder rods 51. The cylinders 50 have the usual ports 52 and 53 to facilitate communication with a fluid pressure source (not shown). Another suitable shifting mechanism may also be provided rather than the hydraulically controlled assembly shown here.

Figure 2:
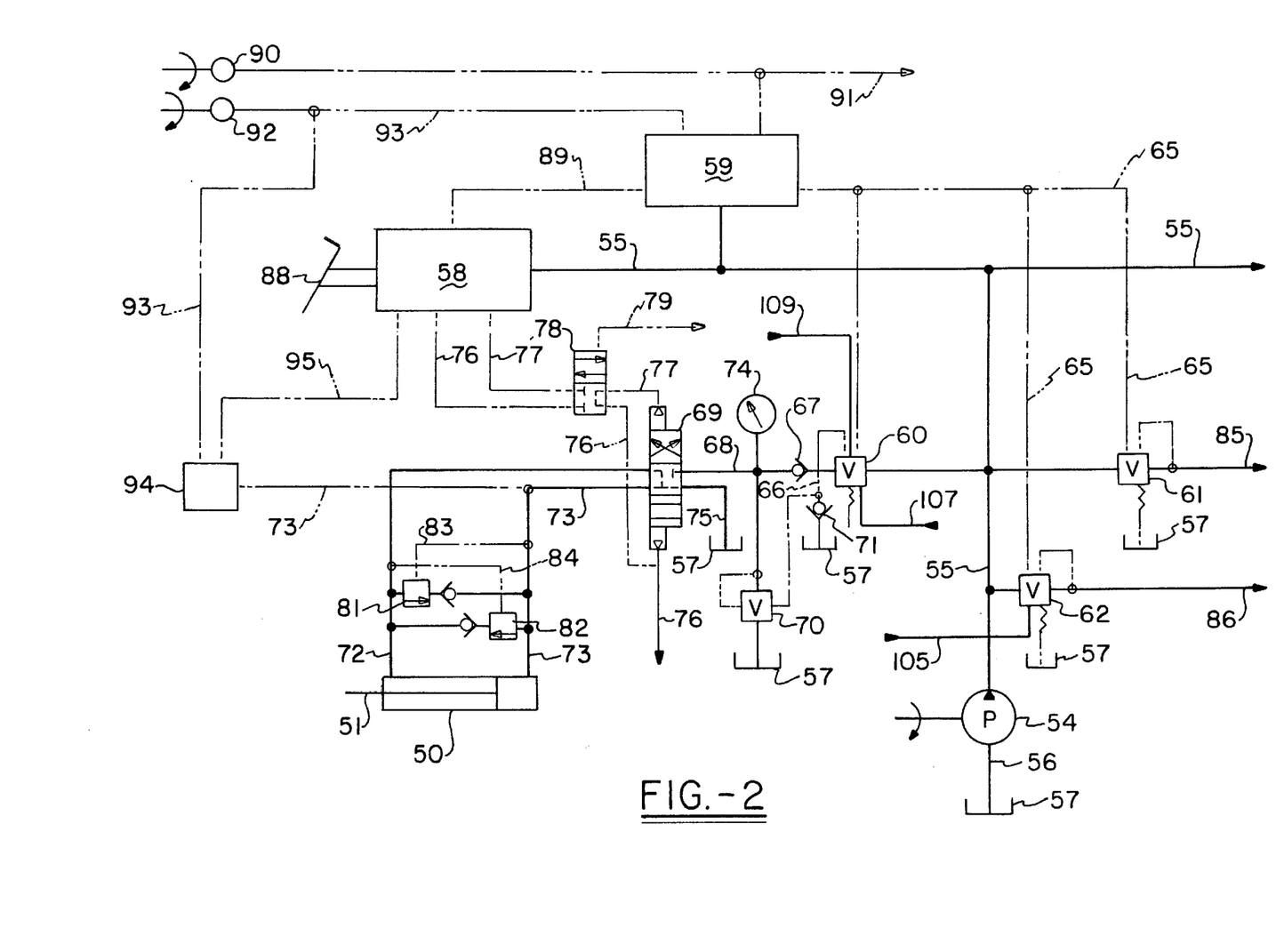
FIG. 2 is a schematic drawing of a fluid pressure control system for the apparatus of FIG. 1.
Figure 3:
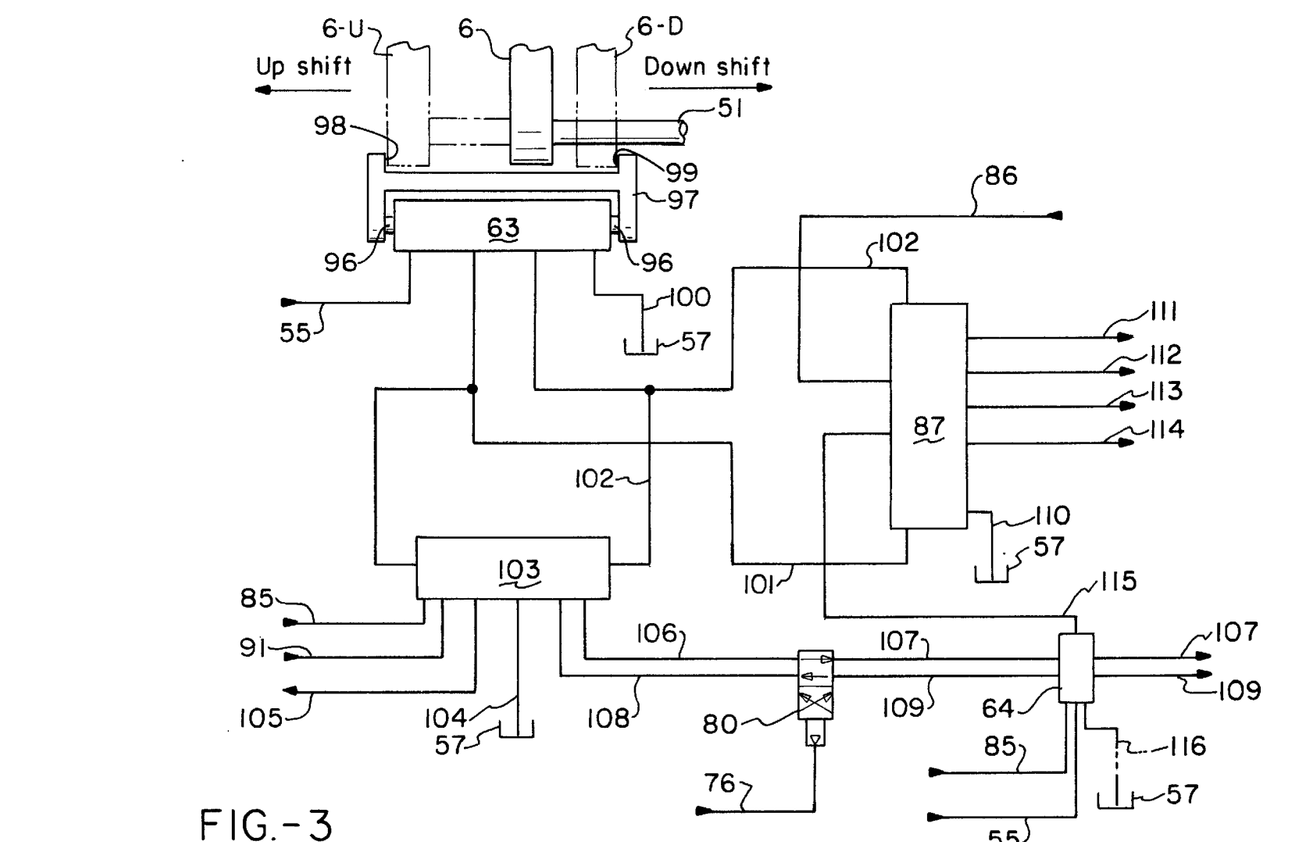
FIG. 3 is a schematic drawing of a clutch selecting and shifting valve system for the apparatus of FIG. 1.

FIGS. 2 and 3 schematically illustrate a control system for controlling the actions of cylinder 50, clutches 32, 33, 39, 41 and all pistons 16. The control system in the preferred embodiment comprises a fluid pressure pump 54, which would normally be driven by the power source common to input shaft 26, and which would supply pressurized fluid, preferably a suitable oil-based lubricant, into a main pressure line 55. Pump 54 draws its fluid supply through intake pipe 56 from an oil pan 57, which, although not shown, would be mounted to the bottom of housing 3 in a usual manner. Pump 54 may be a constant pressure, variable displacement type, as shown, or may be any one of various types suitable for a specific application. Other types of control systems other than hydraulic are also known and contemplated in the invention.

In the hydraulic system, line 55 directs common main pressure to a control module 58, a feedback module 59, pressure reducing valve 60, pressure reducing valve 61, pressure reducing valve 62, an initiating valve 63, a pulse valve 64 and to other elements which may require such pressure supply. Note that reducing vales 60, 61 and 62 are regulated by pilot pressure through common line 65 from feedback module 59.

Reducing valve 60 directs controlled pressure into line 66 and through check valve 67 and line 68 to directional control valve 69 and to a pressure regulated relief valve 70. Relief valve 70 is regulated by pilot pressure from line 66. Check valve 67 is situated to allow free flow from line 66 to line 68, but stops reverse flow. Another check valve 71 is connected to line 66 and situated to allow free flow from the oil pan 57 into line 66, in case of negative pressure, but stops any reverse flow into oil pan 57. A pressure gauge 74 is also connected to line 68 to provide read-out of pressure therein.

Directional valve 69 may be a pilot-operated, three position, four-way valve and is connected through lines 72 and 73 to ports 52 and 53 respectively, of cylinder 50. Line 75 is an exhaust line between valve 69 and oil pan 57. Note that when valve 69 is in its center return position, fluid can flow therethrough between lines 72 and 73 and the pressure from line 68 is stopped. For forward or reverse shifting of valve 69, alternate pilot pressure is supplied from control module 58 though lines 76 and 77 to alternate control points on valve 69, respectively. A pilot control valve 78 is installed in lines 76 and 77 to enable shut-off of pilot pressure to valve 69 when desired. For example in a vehicle, a conventional PARK-NEUTRAL-DRIVE shifter may be provided, wherein shut-off of pilot pressure occurs in either PARK or NEUTRAL position, and to enable application of pilot pressure to valve 69 when such shifter is in its DRIVE position. A pilot line 79 may connect valve 78 to a PARK-NEUTRAL-DRIVE shifter, which is not shown herein, to enable control of valve 78 accordingly.

Pilot pressure is directed through either line 76 or line 77, selectively, by control module 58 such that pressure in line 77 shifts valve 69 forward, or pressure in line 76 shifts valve 69 reverse. Note that pilot line 76 is also connected to a pilot reversing valve 80, shown in FIG. 3, to achieve actions to be explained later. When valve 69 is shifted forward, pressure communicates therethrough from line 68 to line 73 to produce extending force by cylinder 50, while line 72 communicates through valve 69 to exhaust line 75. Alternately, when valve 69 is shifted reverse, pressure communicates therethrough from line 68 to line 72 to produce retracting force by cylinder 50 to selectively position the disk 1, while line 73 communicates through valve 69 to exhaust line 75.

To reduce fluid flow resistance, during rapid travel of cylinder 50, a pair of opposed pressure regulated bypass valve and check valve combinations 81 and 82 may be connected therebetween lines 72 and 73 in close proximity to cylinder 50 so that they are regulated by pilot pressure through lines 83 and 84, respectively. The detailed function of valves 81 and 82 will be explained later.

Pressure reducing valve 61 directs controlled pressure through line 85 commonly to all ports 19 and thereby commonly to all pistons 16, as shown in FIG. 1 and FIG. 4. Note that ports 19 may be axially disposed, as shown in FIG. 1, or radially disposed, as shown in FIG. 4, whichever is more suitable for the application. A common manifold plate or ring may be installed to uniformly communicate between line 85 and the ports 19. As shown in FIG. 3, line 85 also communicates with other elements of the control system.

Pressure reducing valve 62 directs controlled pressure through line 86 to a clutch shifter valve 87, as shown in FIGS. 2 and 3, for controlled communication with the respective clutches of the apparatus in FIG. 1.

As shown in FIG. 2, the control module 58 may be regulated by an actuator mechanism 88, and interacts with feedback module 59 by pilot pressure through line 89. Alternately, module 58 and module 59 could be combined in a single module. The actuator mechanism 88 could be any suitable mechanism such as a pedal, a lever, a remote controlled actuator, or any other effective means for regulating module 58.

The control system preferably is supplied with control signals based on operational parameters and may include for example an input speed tachometer 90, as shown in FIG. 2, coupled to the input power source so as to provide an input speed feedback signal to module 59 through line 91. Similarly, an output speed feedback tachometer 92 may be coupled to the output shaft 47, shown in FIG. 1, so as to provide an output speed feedback signal to module 59 through line 93. Line 93 may also be connected to a speed and throttle control module 94. Another line 95 also connects module 58 with module 94. Line 73 also is connected to module 94.

In the preferred embodiment, module 94 functions as a governor which controls engine speed in response to a signal from module 58 through line 95 and supplies a throttle position signal through line 93 to module 59. A pressure signal through line 73 to module 94 is supplied so as to limit unnecessary engine speed during low ratio operation. Module 94 could, of course, be combined into module 58 and/or module 59, if desired.

Referring to FIG. 3, the operation of the control system in conjunction with the transmission will be discussed. A shift initiating valve 63 is shown for general illustration, to include an operating plunger 96 and a slide 97 connected thereto. Slide 97 has contact surfaces 98 and 99 formed thereon that are positioned and arranged for effective contact with arm 6. Alternatively, valve 63 could be remotely located and actuated electrically, instead of by means of slide 97, in response to movement of arm 6. Line 55 supplies operating pressure to valve 63 while line 100 is a drain. Through lines 101 and 102, valve 63 supplies down shift or up shift pressure, respectively, to a timing valve 103 and to clutch shifting valve 87.

Timing valve 103 receives operating pressure, which will be proportional to traction pressure against pistons 16, through line 85 and also receives a time-retard signal through line 91 which is routed from engine tachometer 90. Valve 103 has a drain line 104 and three different operating output lines: line 105, which directs a pressure decrease signal to reducing valve 62; line 106, which directs a pressure decrease signal through valve 80 to corresponding line 107 and thereby to reducing valve 60; and line 108, which directs a pressure increase signal through valve 80 to a corresponding line 109 to reducing valve 60.

Clutch selector valve 87 receives controlled pressure through line 86 for clutch actuation and also has a drain line 110. Lines 111, 112, 113 and 114 direct actuating pressure from valve 87 to clutches 32, 33, 39 and 41 respectively. The method of connecting lines 111, 112, 113 and 114 to the respective clutches, and the clutch actuating mechanisms are conventional and therefore need not be shown herein.

Pulse valve 64 has a drain line 116 in addition to other lines previously mentioned and which are shown in FIG. 3. Line 107 and 109 communicate through valve 64 to provide required internal action of valve 64. Line 115 directs a triggering pulse to valve 87 whenever such pulses are produced in valve 64. Pulse valve 64 is internally arranged to provide a pulse through line 115 to valve 87 whenever pressure is applied through line 107, or whenever pressure is applied then removed through line 109.

Note that all of the valves and related control circuits hereof can be built together into a single valve block which can be compactly installed in the oil pan of the apparatus in FIG. 1. Furthermore, although the control system of this embodiment is essentially hydro mechanical, any or all elements of the control system could be electric or electronic instead. In addition, if maximum sophistication is desired, a microcomputer or microprocessor can be included to sense factors such as input speed and torque, output speed and torque, oil temperature and viscosity, clutch slippage torque and other significant operational or environmental factors and thereby continually control and optimize the operation of the entire apparatus.

Conversely, in applications requiring relatively little sophistication, a much simpler control system would be adequate. For example, timing valve 103, pilot reversing valve 80 and pulse valve 64, as will be explained later, are needed only to achieve soft or undetectable range shifts, so they could be omitted. Also, in applications wherein the input speed is constant or is independently controlled, speed control module 94 and feedback module 59 could be omitted.

In this embodiment, which may be used in trucks or automobiles, the operation of the apparatus will be explained, wherein ring gear 21 is driven by a truck or automobile engine for operation of a vehicle. In operation, gears 10 and, therefore, cones 7 are driven by ring gear 21, and made to spin at relatively high speeds depending on the ratio between gear 21 and gears 10. For example, at a top input engine speed of 4,000 RPM, cones 7 would spin at speeds up to 20,000 RPM in the preferred embodiment. Obviously, a wide variety of speed and ratio combinations are possible. Also, gears 11 drive output gear 27 at a predetermined speed which, through the multi-range gear system, drive output ring gear 44 at the selected ratio.

During this time, pump 54 supplies pressure, as previously described, so that reducing valve 61 directs at least a preset minimum pressure through line 85 to pistons 16. Thus, sufficient thrust is applied to cones 7 so that cones 7 are in uniform and adequate tractional contact with the rim of disk 1. Therefore, disk 1 and shaft 2 rotate in the same direction as gear 21 and at a relative speed determined by the axial position of disk 1 along cones 7. Shaft 2 drives sun gear 49.

The operation of the transmission will be described in conjunction with an embodiment in a vehicle with control by an operator. The actuator mechanism 88 may at first be in its neutral position so that module 58 sends no signal through line 89, but sends a minimum signal through line 95 directing module 94 to maintain only minimum engine operating speed. In the absence if a signal through line 89, module 59 is inactive and sends no pressure control signal through line 65, regardless of the speed signals through lines 91 or 93 from tachometers 90 and 92. In neutral mode, module 58 sends forward pilot pressure through line 77, however, at first, valve 78 is switched off to block the circuits of line 76 and 77 when the usual PARK-NEUTRAL-DRIVE shifter is in PARK or NEUTRAL position. In this position, valve 69 is at first in neutral position and cylinder 50 is allowed to move freely with no pressure applied.

For low range operation, clutches 33 and 39 will be selected by selector valve 87 and actuating pressure supplied thereto from reducing valve 62. In neutral mode, with no pilot pressure through line 65, reducing valve 62 is preset to direct only minimal actuating pressure and any clutches affected will be only slightly engaged. In low range, clutch 33 holds carrier 28 stationary so that planet gears 29 spin on stationary axes and in a reverse direction as driven by sun gear 30. Ring gear 31 is also driven reverse by the spin of planet gears 29. In the preferred embodiment, ring gear 31 may be twice the diameter of sun gear 30 so that ring gear 31, and therefore clutch body 32, rotates reverse at half-speed during low range operation. Also, since clutch 39 is engaged during low range operation, clutch body 32, clutch body 39, ring gear 38, planet gears 36, carrier 37, planet gears 42, ring gear 43 and output ring gear 44 all rotate together as one unit so that output ring gear 44 rotates reverse at half-speed during low range operation.

It is noted that sun gear 49 is always driven forward by the traction between cones 7 and disk 1. Thus, when disk 1 is at a "synchronous ratio point" relative to cones 7, in low range only, the forward speed of gear 49 matches the reverse speed of gear 44 so that planet gears 45 spin in stationary positions and no output torque is applied to hub 46 nor shaft 47. This condition is commonly referred to as "geared neutral". It should also be recognized that any positive torque between disk 1 and shaft 2 will result in hub 5, with disk 1, being screwed axially along shaft 2, by means of the helical spline, towards the small end of cones 7 reducing the traction ratio and the speed of disk 1 until the above mentioned "synchro point" is reached and the torque is zeroed. Likewise, any negative torque between disk 1 and shaft 2 will result in hub 5, with disk 1, being screwed axially along shaft 2 towards the large end of cones 7 increasing the traction ratio and the speed of disk 1 until the "synchro point" is reached and torque is zeroed. Thus, disk 1 is moved to, and held at, the synchro point by torque reaction through shaft 2 and hub 5, such that the system is self synchronizing.

Still in low range, when the PARK-NEUTRAL-DRIVE shifter is moved to DRIVE and as actuator 88 is pressed forward away from neutral to achieve forward output torque at shaft 47, a signal is switched on through line 89 to activate module 59, valve 78 is switched on, valve 69 shifts to forward, and a proportionate signal is sent through line 95 so that module 94 calls for proportionately increased engine speed. As engine speed increases, the speed signal from tachometer 90 through line 91 causes module 59 to send a proportionately increased pressure signal through line 65. Thus, reducing valve 60 directs increased pressure to cylinder 50, causing rod 51 to extend with proportionate force. Consequently, arm 6 and therefore disk 1 is moved towards the large end of cones 7 increasing the traction ratio and increasing the relative speed of sun gear 49. Thus, the spinning planet gears 45 will begin to orbit in a forward direction, which drives shaft 47 forward.

In this operation, any positive torque reaction from shaft 47 back through shaft 2 will tend to screw hub 5 in a direction counter to the extending force of rod 51, so that the actuating pressure in cylinder 50 will be proportional to the torque output at shaft 47. Notice also that gauge 74 may read-out torque as well as pressure.

Further action of actuator 88 causes module 94 to call for increasing engine speed and engine tachometer 90, through line 91, and causes module 59 to send an increasing pressure signal through line 65 so that reducing valve 60 directs increasing pressure to cylinder 50. Thus, torque output at shaft 47 will increase, since its torque output is proportional to shift pressure in cylinder 50.

During this time, and always in proportion to torque output, and in response to the pressure signal through line 65, reducing valve 61 directs proportionate pressure through line 85 to pistons 16 to maintain desired or sufficient frictional engagement between cones 7 and disk 1 to prevent slippage therebetween, at all achievable speeds and torque loads. Note that since cones 7 are preferably positioned symmetrically about disk 1 and all cones 7 exert equal frictional contact pre-load against disk 1, no net radial load is exerted on disk 1. Effective traction between cones 7 and disk 1 is achieved by means of an elastohydrodynamic oil film maintained on the traction surfaces and between the contact points, at all achievable speeds and loads. Such elastohydrodynamic traction is provided by a variety of lubricants classed as "traction fluids", commonly known by people skilled in the art, and can provide traction coefficients up to nine-percent (9%) or higher. Cones 7 and disk 1 are preferably constructed from materials, such as high grade bearing steels, that can withstand the inherently high contact pressures at high velocity operation. The methods of applying lubricants to the raction surfaces of cones 7 and disk 1, as well as to bearings, gears and clutches, are conventionally known.

In operation, the torque developed in disk 1, which is transmitted through sun gear 49 to shaft 47, is proportional to the gear ratio between gear 49 and hub 46. In an embodiment, the ratio between gear 49 and hub 46 may be four to one (4:1) and the ratio between ring gear 44 and hub 46 may be four to three (4:3). Thus in such an embodiment, disk 1 transmits one-fourth (¼) of the torque at shaft 47 while ring gear 44, and its driving gear and clutch system, transmits three-fourths (¾) of the torque at shaft 47. Of course, in other embodiments, various other ratio combinations are possible.

Also in operation, and always in proportion to torque output and in response to the pressure signal through line 65, reducing valve 62 directs proportionate pressure through line 86 to respective clutches to maintain sufficient clutch engagement to prevent slippage thereof, at all achievable speeds and torque loads.

The control system also provides in the preferred embodiment that the output speed signal from tachometer 92 counters the input speed signal from engine tachometer 90, so that increased output speed of shaft 47 is matched by a proportionately increased input speed, for a given amount of output torque and shift pressure. Thus, in a precalibrated manner, module 59 combines the respective signals from tachometers 90 and 92 so that input power matches output power, according to the equation, power=torque×RPM. In this manner, the engine never becomes overloaded due to increased torque load, but instead increases its speed to match any increase in power demand at output shaft 47.

Accordingly, at low speeds of output shaft 47, at a given torque load, relatively low engine speed is needed in order to match output power. At higher output speeds at the given torque load, higher engine speeds are called for, while at higher output speeds but lower torque loads, reduced engine speed is called for. Similarly, at lower output speeds but higher torque loads, relatively higher engine speed is called for. The continuous ratio shift capability of the invention facilitates the continuous power matching previously described and, by appropriate calibration of module 59, any desired percentage of engine load may be maintained at any and all feasible output speeds and torque loads.

Module 94 may also be configured so that whenever maximum allowable output torque is achieved, as represented by shift pressure in line 73, action within module 94 limits engine speed to no more than is necessary for matched power, regardless of the amount of depression of pedal 88. Also, whenever engine full load is achieved, represented by a fully open throttle position, module 94 sends an appropriate signal through line 93, contracting the signal in line 91, so that module 59 reduces its pressure signal through line 65 thereby reducing torque output, to the extent as calibrated in module 94. Thus, the ratio of the transmission decreases, allowing engine speed to increase to produce more input power. Such a down-shift sequence will occur both when the output load increases and when pedal 88 is depressed further to call for increased output speed.

Still in low range operation, as sufficient shift pressure is maintained to cylinder 50, and resultant sufficient output torque is maintained, disk 1 will shift towards the large end of cones 7 and the speed of output shaft 47 will increase until disk 1 reaches the large end of cones 7, which is the forward limit of its travel. As shown in FIG. 3, arm 6 will then be in position 6-U where it contacts surface 98 on slide 97, thus shifting initiating valve 63 into up-shift mode for higher range operation. In up-shift mode, valve 63 directs pressure through line 102 to timing valve 103 and clutch selector valve 87, setting both valves for clutch up-shift. Whenever timing valve 103 is set in either up-shift or down-shift mode, pressure is directed therethrough from line 85 through line 105 to reducing valve 62 whereby reducing valve 62 reduces pressure through line 86 to respective clutches so that the active clutches can slip at the prevailing torque load. This is to prevent a torque surge at shaft 47 whenever disk 1 re-synchronizes, as will be described hereafter. Also, whenever timing valve 103 is set in up-shift mode, pressure is directed therethrough from line 85 through 106, through valve 80, through valve 64 and line 107 to reducing valve 60 whereby valve 60 reduces shifting pressure to cylinder 50 so as to compensate for the inertial reaction force when disk 1 re-synchronizes, as will be described hereafter.

Whenever pressure occurs in line 107, valve 64 emits a pulse through line 115 to selector valve 87. Since valve 87 is now set for up-shift, the pulse from valve 64 causes valve 87 to advance, in a step-wise manner, so as to select the next higher range clutch combination. Thus, in up-shifting from low range to second range, clutch 41 is engaged, clutch 39 remains engaged, and clutch 33 is disengaged. Thus, clutch 39, clutch body 32, carrier 37, planet gears 36, planet gears 42, sun gear 35, ring gear 43 and ring gear 44 are all together brought to a stop by clutch 41 and held stationary for second range operation. Clutches 31 and 33 are allowed to freewheel.

Whenever ring gear 44 is brought from reverse to a stop in shifting from low to second range, at a given speed of shaft 47, the spin reaction of planet gears 45 causes a decelerating torque through sun gear 49 to shaft 2 and through hub 5 to disk 1 whereby the resultant screw action forces disk 1 back towards the small end of cones 7 to a new synchro position. This is called "re-synchronization". During re-synchronization, active clutches are adjusted, as previously described, to allow clutch slippage so that the torque output at shaft 47 does not change during re-synchronization. When re-synchronization is complete, disk 1 will be at a new synchro position towards the small end of cones 7 and the speeds and ratios matched so that clutch slippage is zeroed. During re-synchronization, disk 1 must be rapidly decelerated to a new speed, thus producing significant inertial torque. Therefore, torque output at shaft 47 is controlled during re-synchronization by clutch slippage regardless of shift pressure to cylinder 50, and may be reduced as described above to allow shift and deceleration of disk 1 at the most efficient rate. Re-synchronization needs to occur quickly to minimize clutch slippage for many applications. Therefore, disk 1 is made as lightweight as feasible, and is shaped to minimize inertia, so as to achieve re-sync times of less than 0.1 second at full speed. For example in a vehicle, the disk 1 may be constructed of a high grade bearing steel, so as to be lightweight, and use of a single disk allows inertia to be minimized. It is also noted that, at low speeds, significant axial drag may be produced during re-sync between disk 1 and cones 7, which can be compensated for by adjustment of shift pressure, as previously described. However, at sufficiently high speeds, and due to physical characteristics, no significant axial drag will occur.

In order for cylinder 50 to be shifted rapidly during re-sync, by-pass valves 81 and 82 are preferably provided to minimize fluid flow resistance. Valves 81 and 82 are connected as shown and are installed as close to cylinder 50 as possible, and fluid passages therethrough are as large as feasible. Valve 81 is arranged to by-pass fluid when cylinder 50 is rapidly extended and valve 82 is arranged to by-pass fluid when cylinder 50 is rapidly retracted. Notice that the pilot line to valve 81 is connected to line 73, and the pilot line to valve 82 is connected to line 72. Check valves are placed in series with each valve 81 and 82 to block reverse flow. Valves 81 and 82 may be arranged to proportionately open and by-pass fluid whenever their respective pilot pressure becomes negative. Thus, whenever cylinder 50 is rapidly retracted during up-shift re-sync, flow resistance causes negative pressure in line 72 so that valve 82 proportionately opens, allowing fluid to by-pass with proportionate resistance from back to front of cylinder 50. Likewise, whenever cylinder 50 is rapidly extended during down-shift re-sync, flow resistance causes negative pressure in line 73 so that valve 81 proportionately opens, bypassing fluid from front to back of cylinder 50.

In order to minimize clutch slippage during range-to-range shifting, the rate of re-sync shift of cylinder 50 needs to be as fast as possible, so long as disk 1 is not caused to over-shoot its new synchro point due to inertia. Therefore, the rate of shift of cylinder 50 must be regulated, during re-sync, to match the acceleration/deceleration time of disk 1 at each and all feasible speeds and torque loads. Note that the shift rate of cylinder 50, in such case, will depend upon: (1) the prevailing torque reaction (load) between shaft 2 and hub 5; (2) the flow resistance through valves 81 and 82, and; (3) the amount of shift pressure reduction produced by pilot pressure through line 107. Since valves 81 and 82 are proportional, their degree of opening will be proportional to the combination of torque load and shift pressure reduction. Thus, at a given torque load, the rate of shift of cylinder 50 can be controlled by regulating the degree of shift pressure reduction. Note that the pressure in lines 106 and 108 and in lines 107 and 109 is supplied by pressure from line 85, which is proportional to torque load (but never below a preset minimum). Thus, the degree of shift pressure change during range-to-range shifts is indeed proportional to torque load and, therefore, the rate of re-sync shift of disk 1 is also proportional to torque load so as to always match acceleration/deceleration time. In higher speed operation, the higher speeds require proportionally increased acceleration/deceleration times for disk 1, and therefore slower shift rates of cylinder 50. Therefore, an increased speed signal through line 91 counteracts pressure from line 85 within valve 103 so that the rate of shift of disk 1 is reduced in inverse proportion to increased speed. Thus, the rate of re-sync of disk 1 during range-to-range shifts is reduced in inverse proportion to speed to always match the acceleration/deceleration time of disk 1, at all feasible speeds and torque loads. Accordingly, the quickest re-sync of disk 1 will occur at slowest speed and maximum torque load, and the slowest re-sync will occur at maximum speed and minimum torque load. Notice that at maximum speed and maximum torque load, re-sync time will normally be less than 0.1 second. It is noted that in reference to FIG. 3, that anytime re-sync shift begins, arm 6 will immediately move away from contact with slide 97, allowing valve 63 to switch off. This starts the reset time of valve 103 and prevents over-stepping of valve 87. The reset time of valve 103 desirably matches the re-sync time of disk 1, at each and all speeds and torque loads. Thus, using valve 103, pressure from line 85 reduces the reset time of valve 103 as torque load proportionately increases. Also, the speed signal through line 91 increases the reset time of valve 103 as input speed proportionately increases. Hence, reset of valve 103 occurs precisely when re-sync of disk 1 is completed, at each and all speeds and torque loads. Of course, when valve 103 resets, pressures to lines 105, 106 and 108 switch off so that clutches are restored to fill (non-slip) engagement, and shift pressure to cylinder 50 is restored to torque equivalent pressure. Within a given gear range, torque is controlled by shift pressure to cylinder 50. However, during any range-to-range shift, and specifically during re-sync of disk 1, which is relatively quick, torque is temporarily controlled by clutch slippage.

Continuing with operation of the invention, when acceleration of shaft 47 continues in the second range, disk 1 again proceeds to the large end of cones 7 whereby a shift to third range is likewise triggered. In third range, clutch 41 remains engaged, clutch 32 engages, clutch 39 disengages and clutches 33 and 39 free-wheel. As an example in this embodiment, planet gear sets 36 and 42 may provide a two-to-one (2:1) ratio between sun gear 35 and ring gear 43, so that ring gear 44 runs forward at half-speed during third range operation. Valves react and disk 1 re-synchronizes as previously described so that, as shaft 47 continues to accelerate, disk 1 again proceeds in third range towards the large end of cones 7. When disk 1 again reaches the large end of cones 7, a shift into fourth range is likewise triggered. In fourth range, clutches 32 and 39 engage and clutches 33 and 41 free-wheel, so that ring gear 44 runs forward at full speed in fourth range operation. The range of speeds provided by these four ranges are intended for a vehicle, but other ranges or ratios and gear arrangements are contemplated. Thus, when disk 1 again reaches the larger end of cones 7, in fourth range, no shift will occur because the highest range is now engaged.

Further, in operation of the preferred embodiment, at any speed and torque load at shaft 47, when actuator 88 is returned to neutral position, the signal through line 89 is switched off so that module 59 zeroes the signal through line 65, which zeroes output torque, regardless of the speed signals in lines 91 and 93.

To achieve negative torque and deceleration at shaft 47, actuator 88 is moved past neutral in the deceleration direction, whereby pilot pressure is switched within module 58 from line 77 to line 76, which reverses valve 69. Thus, for negative torque output, shift pressure is applied to cylinder 50 through line 72 so that disk 1 is proportionately forced towards the small end of cones 7. The resultant deceleration of sun gear 49 applies a negative torque through planet gears 45 to hub 46 and shaft 47. Slight movement of actuator 88 into a deceleration position also directs a signal through line 95 to module 94, which proportionately drains off or reduces the signal in line 93, and which calls for maximum engine deceleration. With engine deceleration, the signal through line 91 will likewise decrease, however, the already reduced signal in line 93 causes module 59 to send an increased torque signal through line 65. Thus, engine speed may actually increase when sufficient negative torque load is applied, even though module 94 is calling for reduced engine speed. To prevent engine over-speed, module 59 is calibrated so that a maximum engine speed signal through line 91, causes module 59 to override the torque signal through line 65, thus reducing negative torque load. Further movement of actuator 88 into a deceleration position proportionately increases negative torque, but allows engine throttle position to open.

Notice that down-shift clutch action occurs whenever arm 6 moves to position 6-D, in the same but opposite manner that up-shift occurs when arm 6 moves to position 6-U. Thus, as shaft 47 continues to decelerate, range-to-range down-shifts occur, in reverse order to that previously described for up-shift, until low range is again engaged.

To achieve reverse rotation and output at shaft 47, which is possible only in low range, actuator or pedal 88 is moved to the deceleration position whereby valve 69 is reversed and cylinder 50 applies down-shift force to disk 1. As pedal 88 is moved further into the deceleration position, module 94 calls for increased engine speed so that the speed signal through line 91 causes module 59 to send a proportionate torque signal through line 65. Thus, disk 1 moves past its synchro point towards the small end of cones 7 to produce reverse output at shaft 47.

When operating forward at sufficient speed, down-shift with positive torque applied may occur, such as in the case of overload at shaft 47. As in all down-shifts, when valve 103 is set for down-shift, pressure is applied through line 108 instead of line 106. With positive torque applied, valve 80 is not reversed, so that line 108 coincides with line 109. Thus, valve 64 does not immediately transmit a pulse and valve 87 does not immediately select a new clutch combination. Pressure through line 105 produces a reduction in clutch pressure, while pressure through line 109, to reducing valve 60, produces an increase in shift pressure to cylinder 50. Thus, the active clutches slip at the prevailing torque load, allowing disk 1 to be shifted towards the large end of cones 7 by the increased force of cylinder 50. Valve 103 is timed to reset so that pressure is removed from line 109, causing a delayed pulse from valve 64 to valve 87, so that the next lower clutch combinations engaged precisely when disk 1 reaches its new synchro point. The clutches are then restored to full (non-slip) engagement, and cylinder 50 is restored to torque equivalent pressure. Thus, down-shift under positive torque load is achieved with no change in torque at shaft 47.

In like manner, up-shift may occur while negative torque is applied, except that delayed clutch engagement is accomplished differently. Notice that in the case of negative torque, valves 69 and 80 are reversed. Also, since valve 103 is set for up-shift, pressure is directed into line 106 instead of line 108, but valve 80 is reversed so that pressure is directed into line 109. Thus, a delayed clutch stepping pulse is sent from valve 64 to valve 87 so that the new clutch combination is engaged, full clutch engagement is restored, and torque equivalent pressure is restored to cylinder 50, all at the same time that disk 1 reaches its new synchro position. Thus, either up-shift or down-shift, with either positive or negative torque applied, can be achieved without producing output torque variations or surges, at any feasible torque load.

Thus, from the foregoing description of a preferred embodiment, it can now be seen that the present invention provides a mechanismal power transmission apparatus having continuously variable ratios and high power density. The invention provides the objects and advantages as described while being cost-effective in manufacturing and implementation into any of a variety of environments, including vehicle transmissions.

It should also be understood that the invention is not to be limited to the particular embodiments as described, and, various alterations and additions to the mechanism and control system are possible by persons skilled in the art, without departing from the essential concept and scope of the invention. For example, a lubrication system may be provided to cool and lubricate bearings, gears, rollers, etc. Also, different embodiments of the invention may include different numbers of conical rollers, different speeds or ratios, different numbers or gear ranges, different control methods, all depending on the particulars of a specific application.

What is claimed is:

1. A power transmission apparatus for varying the speed ratio of an output member relative to a driven input member comprising;
    a housing supporting input and output members, said input member coupled in driving engagement with at least one traction drive member to transfer torque to said at least one traction drive member,
    a disk member positioned in cooperative relationship with a rotatable shaft having an axis and in driving engagement with said at least one traction drive member, said disk member being driven by said at least one traction drive member to transfer torque to said rotatable shaft, wherein said disk is selectively axially moveable on said rotatable shaft at least in part in response to torque load on said output member to vary the position of said disk member relative to the at least one traction drive member to selectively vary the traction ratio between said traction drive member and said disk; wherein
    said output member is selectively coupled in driving engagement with said rotatable shaft to transfer torque thereto at a predetermined speed ratio relative to said input member.

2. The power transmission apparatus as in claim 1, wherein,
    a plurality of traction drive members are situated about the periphery of said disk member, each of said traction drive members comprising a conical rotor having an edge positioned substantially parallel to and in driving engagement with said disk member.

3. The power transmission apparatus of claim 1 further comprising,
    a shifting mechanism associated with said disk member to selectively position said disk member at a predetermined axial position on said rotatable shaft relative to said at least one traction drive member to vary the output torque transferred to said rotatable shaft.

4. The power transmission apparatus of claim 3, wherein said shifting mechanism includes a helical spline formed on said rotatable shaft.

5. The power transmission apparatus of claim 1, wherein,
said at least one traction drive member includes a force applying mechanism arranged to act on said at least one traction drive member to selectively force said at least one traction drive member into effective tractional contact with said disk member.

6. The power transmission apparatus of claim 5, wherein said force applying mechanism acts at least in part in response to torque load on said disk member.

7. The power transmission apparatus of claim 1, wherein,
said at least one traction drive member is a rotor having a mounting shaft including a gear member coupled to be driven by said input member, said at least one traction drive member further including an output shaft including an output gear member, said output gear member in driving engagement with the sun gear of a first planetary gear set, said planetary gear set further including a ring gear and a pinion gear set supported in a carrier, said planetary gear set being selectively drivingly coupled to said output member to transfer torque thereto.

8. The power transmission apparatus of claim 7, wherein,
said rotatable shaft driven by said disk member is in driving engagement with an output sun gear coupled in driving engagement with said output member and said planetary gear set is in selective driving engagement with said sun gear so as to provide a parallel differential drive system through which said disk member and said at least one traction drive member transfer torque to said output member at said predetermined speed ratio.

9. The power transmission apparatus of claim 1, further comprising a differential gear assembly operably coupled to said input power source, said gear assembly comprising a ring gear selectively coupled to drive an output planetary gear set arranged to selectively drive an output shaft.

10. The power transmission apparatus of claim 9, wherein
the ratio of output torque transferred to said output member from said rotatable shaft or from said differential gear assembly, both of which are driven by said at least one traction drive member are matched at a synchronous ratio point based upon the desired torque output from said output member by axial movement of said disk member.

11. The power transmission of apparatus of claim 9, further comprising,
a control system associated with said differential gear assembly, said control system receiving control signals relating at least to the input and output speeds of the transmission, said control system operating said differential gear assembly to provide desired output speed and torque therefrom to match the output power from the transmission to the input power from said input power source.

12. The power transmission apparatus of claim 9, further comprising a control system associated with said differential gear assembly and with said disk member, said control system responding to control signals relating to the axial position of said disk member, said control system operating said differential gear assembly to provide desired matching speed ratios between said disk member and said differential gear assembly.

13. The power transmission apparatus of claim 1, wherein said control system responds at least in part to control signals relating to the axial position of said disk member.

14. A power transmission apparatus comprising a housing supporting input and output members, said input member coupled in driving engagement with at least one traction drive member to transfer torque to said at least one traction drive member,
a disk member positioned in cooperative relationship with a rotatable shaft having an axis and in driving engagement with said at least one traction drive member, said disk member being driven by said at least one traction drive member to transfer torque to said rotatable shaft, wherein said disk is selectively axially moveable on said rotatable shaft to vary the position of said disk member relative to the at least one traction drive member to selectively vary the traction ratio between said traction drive member and said disk; wherein
said output member is selectively coupled in driving engagement with said rotatable shaft to transfer torque thereto at a predetermined speed ratio relative to said input member, and wherein
said at least one traction drive member is a rotor having a mounting shaft supported within a bearing mechanism, and said force applying mechanism is a piston assembly mounted in association with said bearing, said piston selectively applying axial thrust to said rotor through said shaft.

15. A continuously variable mechanical power transmission apparatus comprising a disk member positioned in cooperative relationship with a rotatable shaft having an axis, said disk member in driving engagement with a plurality of traction drive members, said plurality of traction drive members including a driving surface positioned parallel to the axis of said disk member, wherein said disk member is selectively axially moveable on said rotatable shaft to vary the position of said disk member relative to the plurality of traction drive members to selectively vary the traction ratio between said plurality of traction drive members and said disk member,
said plurality of traction drive members positioned to be driven by an input power source at a first end thereof, the second end thereof in driving engagement with a gear system comprising a ring gear in driving engagement with an output planetary gear set, wherein
said rotatable shaft is arranged to drive an output sun gear associated with said planetary gear set, said sun gear also being in driving engagement with said planetary gear set to provide parallel differential drive arrangement through which said disk member and said plurality of traction drive members transfer output torque to an output member coupled in driving engagement with said planet gears.

16. The power transmission apparatus of claim 15, further comprising,
a shifting mechanism for controlling the axial position of said disk member relative to said plurality of traction drive members whereby the ratio between said disk member and said traction drive members is varied for control of output speed and torque of said output member.

17. The power transmission apparatus of claim 16, wherein said shifting mechanism includes a helical spline formed on said rotatable shaft.

18. The power transmission apparatus of claim 15, wherein said gear system is a selectable multi-range gear system.

19. The power transmission apparatus of claim 15, further comprising a control system associated with said gear system and with said disk member, said control system responding to control signals relating at least in part to the axial position of said disk member, said control system operating said gear system to provide desired matching speed ratios between said disk member and said gear system.

20. A continuously variable transmission comprising:
an input power source coupled in driving engagement with at least one traction drive member, said at least one traction drive member having a drive surface,
a disk member driven by said at least one traction drive member,
said disk member torsionally coupled to a coaxial shaft and being selectively moveable relative to said drive surface to vary the ratio of torque transferred thereto from said at least one traction drive member,
a differential gear assembly operably coupled to said input power source, said gear assembly comprising a ring gear selectively coupled to drive an output planetary gear set arranged to selectively drive an output shaft,
said coaxial shaft being arranged to transfer torque to said output sun gear in a predetermined ratio along with said differential gear assembly, wherein the position of said disk member relative to said drive surface is selectively adjusted to vary the ratio of torque and speed transferred to said sun gear by said coaxial shaft relative to said differential gear assembly.

21. The transmission of claim 20, further comprising, a shifting mechanism for controlling the axial position of said disk member relative to said drive surface.

22. The transmission of claim 21, further comprising,
a control system associated with said shifting mechanism and said differential gear assembly, said control system operating said shifting mechanism to selectively vary the position of said disk member, said control system also receiving control signals relating at least to the input and output speeds of the transmission, said control system operating to match the output power from the transmission to the input power from said input power source.

23. The transmission of claim 21, wherein the said shifting mechanism includes a helical spline formed on said coaxial shaft.

24. The transmission of claim 20, wherein,
the position of said disk member relative to said drive surface is varied in reaction to output torque to selectively maintain a synchronized ratio between the speed and torque transferred to said sun gear by said coaxial shaft relative to said differential gear assembly.

25. The transmission of claim 20, wherein,
said differential gear assembly includes a gear system including at least two planetary gear sets providing predetermined gear ratios to provide outputs in a desired speed range.

26. The power transmission apparatus of claim 20, wherein,
said at least one traction drive member includes a force applying mechanism arranged to act on said at least one traction drive member to selectively force said at least one traction drive member into effective tractional contact with said disk member.

27. The power transmission apparatus of claim 20, further comprising a control system associated with said differential gear assembly and with said disk member, said control system responding to control signals relating to the axial position of said disk member, said control system operating said differential gear assembly to provide desired matching speed ratios between said disk member and said differential gear assembly.

28. A power transmission apparatus comprising a housing supporting input and output members, said input member coupled in driving engagement with at least one traction drive member to transfer torque to said at least one traction drive member,
a disk member positioned in cooperative relationship with a rotatable shaft having an axis and in driving engagement with said at least one traction drive member, said disk member being driven by said at least one traction drive member to transfer torque to said rotatable shaft, wherein said disk is selectively axially moveable on said rotatable shaft to vary the position of said disk member relative to the at least one traction drive member to selectively vary the traction ratio between said traction drive member and said disk; wherein
said output member is selectively coupled in driving engagement with said rotatable shaft to transfer torque thereto at a predetermined speed ratio relative to said input member, and wherein
said disk member includes a hub portion mounted upon said rotatable shaft, said hub portion torsionally coupled to said rotatable shaft by means of a helical spline formed on said rotatable shaft.

* * * * *